United States Patent
Dressler et al.

(10) Patent No.: US 6,591,603 B2
(45) Date of Patent: Jul. 15, 2003

(54) PINTLE INJECTOR ROCKET WITH EXPANSION-DEFLECTION NOZZLE

(75) Inventors: Gordon A. Dressler, Manhattan Beach, CA (US); Thomas J. Mueller, Long Beach, CA (US); Scott J. Rotenberger, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 34 days.

(21) Appl. No.: 09/802,002

(22) Filed: Mar. 8, 2001

(65) Prior Publication Data

US 2003/0046923 A1 Mar. 13, 2003

(51) Int. Cl.[7] .............................. B64C 15/02; F02V 9/00
(52) U.S. Cl. .............................. 60/258; 60/239; 60/259; 244/12.1
(58) Field of Search .......................... 244/12.1; 431/58; 60/258, 259, 271, 211, 208, 273, 255, 239, 222; 239/584, 239, 265.19, 265.23, 265.43

(56) References Cited

U.S. PATENT DOCUMENTS

| | | | | |
|---|---|---|---|---|
| 3,150,485 A | * | 9/1964 | Hickerson | 60/258 |
| 3,167,912 A | * | 2/1965 | Ledwith | |
| 3,234,731 A | * | 2/1966 | Dermody et al. | 60/258 |
| 3,451,222 A | * | 6/1969 | Kelley | 60/258 |
| 3,698,642 A | * | 10/1972 | McCullough | |
| 3,699,772 A | * | 10/1972 | Elverum, Jr. | 60/258 |
| 3,712,063 A | * | 1/1973 | Andrysiak et al. | 60/271 |
| 3,722,219 A | * | 3/1973 | Spencer | 60/258 |
| 3,726,480 A | * | 4/1973 | Miltenberger | 239/265.19 |
| 3,748,852 A | * | 7/1973 | Cole et al. | 60/258 |
| 3,863,442 A | * | 2/1975 | Schmidt et al. | 60/258 |
| 3,871,173 A | * | 3/1975 | McKenna | 60/258 |
| 5,394,690 A | * | 3/1995 | Arszman et al. | 60/271 |
| 6,112,512 A | * | 9/2000 | Miller et al. | 239/265.19 |
| 6,205,770 B1 | * | 3/2001 | Williams et al. | 60/258 |

OTHER PUBLICATIONS

Robert A. Wasko, "Performance of Annular Plut and Expansion–Deflection Nozzles Including External Flow Effects at Transonic Mach Numbers", NASA Technical Note TN–D–4462, Apr. 1968.

Dr. A. R. Graham, "NASA Plug Nozzle Handbook".

* cited by examiner

Primary Examiner—Michael J. Carone
Assistant Examiner—Lulit Semunegus
(74) Attorney, Agent, or Firm—Harness, Dickey & Pierce, P.L.C.

(57) ABSTRACT

The present invention provides a rocket engine (10) that is self-compensating on nozzle thrust coefficient for varying ambient backpressures. The rocket engine (10) includes a combustion chamber (12) having an injector end (14) and a nozzle end (16). A propellant injector (20) is in fluid communication between a propellant line and an inside periphery of the combustion chamber injector end (14). A nozzle throat (18) is formed at the nozzle end (14) of the combustion chamber (12). A nozzle exit cone (22) extends outwardly from the nozzle throat (18). A plug support (30) is coupled between a nozzle plug (28) and the propellant injector (20). The nozzle plug (28) aerodynamically self-compensates for changes in ambient backpressure at the nozzle exit cone (22) such that the nozzle thrust coefficient is maximized for any ambient backpressure.

25 Claims, 3 Drawing Sheets

PINTLE INJECTOR ROCKET WITH EXPANSION-DEFLECTION NOZZLE

BACKGROUND OF THE INVENTION

1. Field of the Invention

The present invention relates generally to rocket engines, and in particular to rocket engines that include an expansion-deflection nozzle.

2. Discussion of the Related Art

A typical liquid-fueled rocket engine includes a cylindrically symmetric combustion chamber that has an injector attached to one end and a flared nozzle attached to an opposing end. A liquid propellant including fuel and oxidizer flows through injector ports in the injector and into the combustion chamber. The propellant is ignited within the combustion chamber, causing a rapid expansion in combustion gases which are emitted through the nozzle. The rapidly exiting gases drive the rocket engine and attached rocket structure in the opposite direction.

The nozzle serves to transform the energy produced in the combustion chamber into a driving force by transforming the potential energy contained in the combustion gases into kinetic energy provided by the pressure-reduced exiting gases. In an ambient vacuum environment, the efficiency of the transformation process improves as the pressure drop provided by the nozzle increases. Conventional conical or Bell expansion nozzles used on rocket engines suffer from performance inefficiencies when operated at variable altitudes during flight, due to variable nozzle ambient backpressure. The inefficiencies occur because the typical nozzle can only be optimized for maximum nozzle thrust coefficient at one backpressure condition. Since the maximum nozzle thrust coefficient varies with altitude, the thrust developed by the rocket engine also varies with altitude.

Therefore, there is a need for a nozzle that is self-compensating in response to variable external pressures so that expansion efficiency, and therefore thrust, is maximized regardless of the range of operating altitudes the rocket may experience. Conventional expansion-deflection, or plug, nozzles have been known to provide self-compensation for varying ambient backpressures. However, conventional plug nozzles have been limited due to thermal management problems with the plug immersed in the exhaust flow and the associated support structure. Universally, conventional nozzle plugs do not attach to the propellant injector due to the excessive temperatures that exist within the vicinity of the injector. Instead, the nozzle plug is attached to a wall of the combustion chamber or nozzle throat. Heretofore, using a conventional nozzle plug with internal expansion off of the plug has not been practical due to severe thermal loads imposed on support structures associated with the plug. To operate correctly, the plug must be mechanically supported within the flow of the combustion gases. However, heat generated by the combustion gases and gas flow velocities approaching Mach 1 at the nozzle throat impose intense thermal loads on the support structures.

SUMMARY OF THE INVENTION

The present invention provides a rocket engine that is self-compensating for varying ambient backpressures. The rocket engine includes a combustion chamber having an injector end and a nozzle end. A propellant injector is in fluid communication between one or more propellant lines and an inside periphery of the combustion chamber at the injector end. A nozzle throat is formed at the nozzle end of the combustion chamber. A nozzle exit cone extends outwardly from the nozzle throat. A plug support is coupled between a nozzle plug and the injector. The nozzle plug aerodynamically self-compensates for changes in ambient backpressure at the nozzle exit cone such that the nozzle thrust coefficient is maximized for any ambient backpressure.

For a more complete understanding of the invention, its objects and advantages, reference may be had to the following specification and to the accompanying drawings.

DETAILED DESCRIPTION OF THE PREFERRED EMBODIMENT

Figure 1:
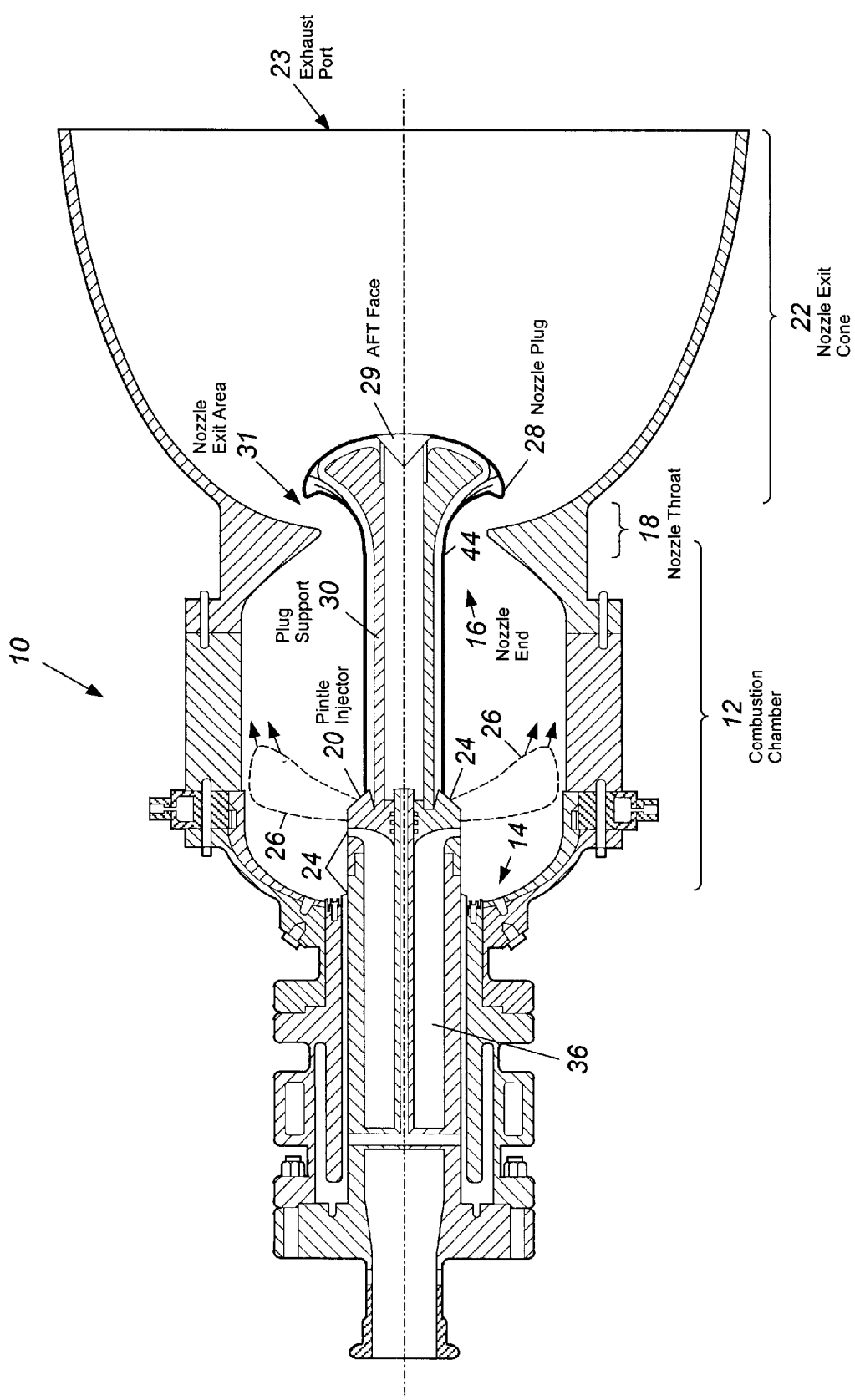
FIG. 1 illustrates a perspective view of a presently preferred embodiment of a rocket engine in accordance with the teachings of the invention.

Referring to FIG. 1, a rocket engine 10 for powering a booster rocket according to the present invention is shown. While the present invention is shown and described as powering a booster rocket, it will be appreciated that the particular vehicle is merely exemplary, and the rocket engine 10 could be used with other vehicles such as launch vehicle first and second stages, tactical missiles, and ground to air missiles. The rocket engine 10 includes a combustion chamber 12 for the mixing and ignition of propellant. The combustion chamber 12 has an injector end 14 for receiving propellant and a nozzle end 16 for emitting combustion products. The nozzle end 16 includes a narrowed nozzle throat 18 leading to a nozzle exit cone 22 and exhaust port 23 through which the combustion products are expelled.

A pintle injector 20 is attached to the injector end 14 of the combustion chamber 12. Although a pintle injector is preferably employed, the scope of the invention includes using other propellant injectors such as distributed element injectors. The pintle injector 20 supplies propellant to the combustion chamber 12 through a series of injector ports 24 located on the periphery of the pintle injector 20. Some of the injector ports 24 supply fuel while others of the injector ports 24 supply an oxidizer. The fuel and oxidizer flow through their respective injector ports 24 into the interior of the combustion chamber 12 and mix together. The mixture of fuel and oxidizer forms a primary combustion zone 26 at the injector end 14 of the combustion chamber 12. The primary combustion zone 26 is somewhat torus shaped, extending outwardly from the pintle injector 20 towards the wall of the combustion chamber 12. The combustion products resulting from the combustion expand rearwardly and outwardly through the nozzle exit cone 22 driving the rocket engine 10 and the vehicle to which it is attached in the opposite direction.

A nozzle plug 28 is attached in cantilever fashion by means of a plug support 30 to the pintle injector 20. The nozzle plug 28 deflects the combustion products as they are emitted from the combustion chamber 12 providing self-compensation for variable ambient back-pressures. As a result of back-pressure self compensation, the generated thrust of the rocket is maximized for all altitude conditions that the rocket may experience given otherwise constant operating conditions. The shape and spatial relation of the nozzle plug 28 and nozzle throat 18 are based on well-known design literature including "NASA Plug Nozzle Handbook", by Dr. A. R. Graham, General Electric Company, prepared for NASA Manned Spacecraft Center under contract NAS 9-3748, and "Performance Of Annular Plug And Expansion-Deflection Nozzles Including External Flow Effects In Transonic Mach Numbers", NASA technical note TN D-4462, April 1968, which are hereby incorporated by reference in their entirety. Those skilled in the art will readily recognize that the particular shape and spatial relation of the nozzle and nozzle throat are highly dependent on the specific application. For example, nozzle plugs and nozzle throats may be designed to have a variety of shapes including circular (annular) and rectangular. The spatial relation of the nozzle plug and throat depend on several factors such as whether partial internal expansion or full external expansion is desired.

The plug support 30 is preferably axisymmetric in shape such as a tubular duct extending from the pintle injector 20 through the narrowed throat 18 into the nozzle exit cone 22. The nozzle plug 28 has an aft face 29 that faces towards the exhaust port 23. The aft face 29 in the presently preferred embodiment has a convex circular shape extending outwardly toward the walls of the nozzle exit cone 22 so that the effective aft plug area described by the outer circumference of the nozzle plug 28 is somewhat greater the effective nozzle throat area defined by the nozzle throat 18. As explained above, this shape is driven by the design constraints of the particular application. The nozzle plug 28 is spaced away from the nozzle throat 18 so that a nozzle exit area 31 permits the flow of combustion gases out of the combustion chamber 12.

Figure 2:
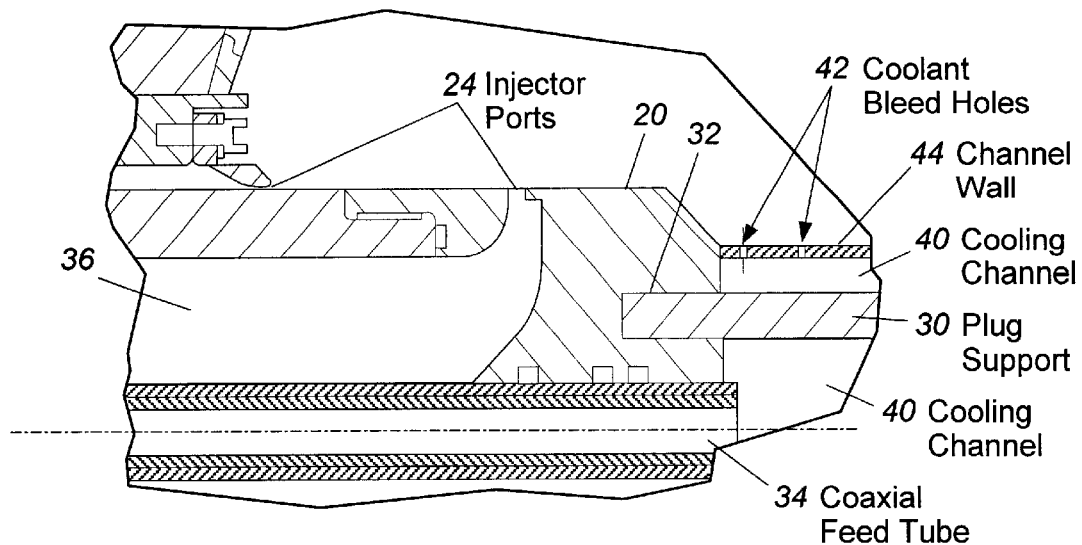
FIG. 2 illustrates an expanded two-dimensional view of a presently preferred embodiment of the interface between an injector and a plug support in accordance with the teachings of the invention.

Referring to FIG. 2, an expanded illustration of the interface between the pintle injector 20 and the plug support 30 is provided. Preferably, the plug support 30 includes a screw-on tip 32 for attaching the plug support 30 to the pintle injector 20. However, other methods of attachment such as bolting, welding, shrinkfitting, and pressfitting are within the scope of the invention. The screw-on tip 32 permits the plug support 30 to be installed onto the injector 20 through the nozzle throat 18. To provide cooling, a coaxial feed tube 34 is inserted coaxially down a propellant passage sleeve 36 of the injector 20. In the preferred embodiment of this invention, the coolant fed through tube 34 would be a cryogenic propellant that was also being used separately to contribute to main engine combustion and rocket thrust. Examples of this would be liquid hydrogen or liquid oxygen. However, other fluids, including non-cryogenic propellants and separate non-propellant liquids and gases can provide suitable cooling performance and are within the scope of this invention. Seals are used at the end of the coaxial feed tube 34 to couple the tube 34 to the tip of the pintle injector 20 and the plug support 30. A cooling channel 40 within the plug support 30 is in fluid communication with the coaxial feed tube 34. The cooling channel 40 extends up the center of the plug support 30 to the aft face 29 of the nozzle plug 28 and along the periphery of the plug support 30. Spaced along the cooling channel 40 are coolant bleed holes 42 located in an outer channel wall 44 to provide film cooling of the channel wall 44, nozzle plug 28, and plug support 30. The combination of the coaxial feed tube 34 and isolation via seals permits an independently controlled bleed of liquid/gaseous fluid into the cooling channel 40 to cool the channel wall 44, plug support 30, and nozzle plug 28 during engine firing. The scope of the invention includes other well-known methods of cooling such as transpiration, wherein the plug support 30 would be made of a porous material through which the coolant would flow, thereby eliminating the need for the outermost channel wall 44 and bleed holes 42.

Figure 3:
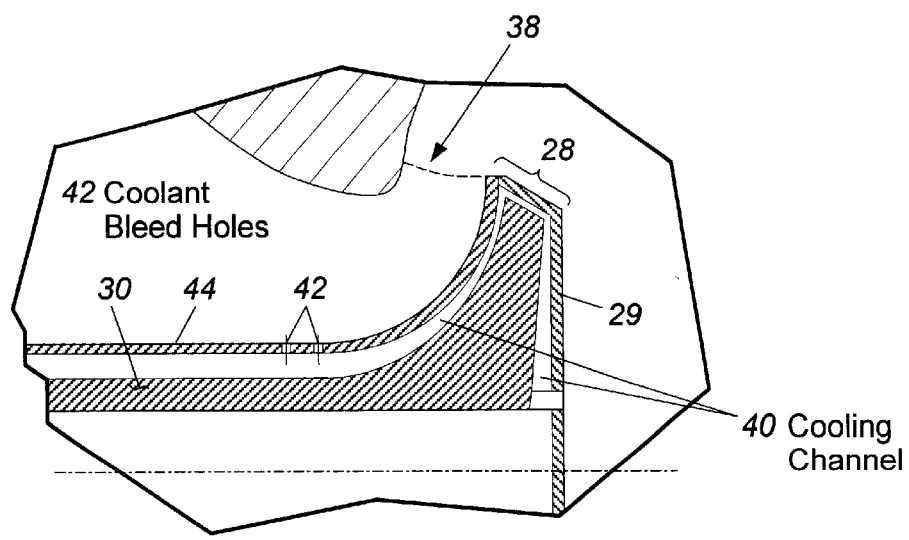
FIG. 3 illustrates an expanded two-dimensional view of a presently preferred embodiment of a plug support and nozzle plug in accordance with the teachings of the invention.

Referring to FIG. 3 in addition to FIG. 2, an expanded illustration of the nozzle plug aft face 29 and the cooling channel 40 is provided. Coolant flows along the central portion of the plug support 30 to the nozzle plug aft face 29, then flows radially outward to provide cooling to the aft face 29. The coolant then travels back along the plug support 30 along cooling channels 40 formed by the outermost channel wall 44. To reduce the cooling demand in the cooling channels 40, and to ultimately dump the coolant flow into the combustion gases to improve mass utilization efficiency by the rocket, the coolant fluid is bled onto the outer surface of the plug support 30 through bleed holes 42 in at least two locations. For example, first, just upstream of the turning radius of the nozzle plug 28, and second, just aft of the pintle injector 20. The injected flow is properly pressure-balanced and geometrically introduced to provide adequate cooling of downstream external surfaces. Those familiar in the art will recognize this as an implementation of active film cooling of the outermost exposed surface 44.

Figure 4:
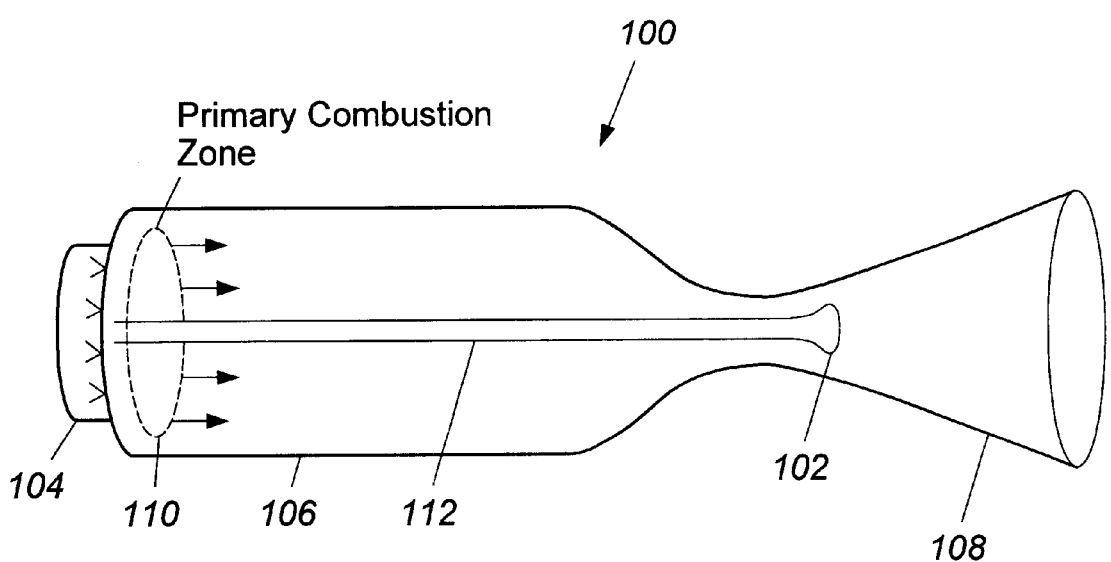
FIG. 4 illustrates a two-dimensional view of another embodiment of the rocket engine.

Referring to FIG. 4, another embodiment of a rocket engine 100 employing a nozzle plug 102 is illustrated. In this embodiment, a distributed element injector 104 (such as "impinging" or "co-axial" injectors) is connected to one end of a combustion chamber 106. The distributed element injector 104 includes several injector ports distributed across the combustion chamber end so that a central portion of the combustion end is devoid of injector ports. The central portion is used for mounting a plug support 112. A nozzle exit cone 108 connects to the other end of the combustion chamber 106. A combustion zone 110 is dispersed in close proximity to the distributed element injector 104. The plug support 112 is coupled between the nozzle plug 102 and the central portion of the distributed element injector 104. The plug support 112 passes close to or through the primary combustion zone 110 before connecting to the nozzle plug 102. Intense heating by combustion gases in the primary combustion zone 110 imposes a somewhat higher thermal load on the plug support 112 than in the presently preferred embodiment. However, employing a stronger cooling system similar to the preferred embodiment can compensate for the higher thermal load.

The present invention recognizes the unique advantages of combining a pintle injector and plug nozzle in a rocket engine. The primary combustion zone associated with a pintle injector spreads outward from the pintle injector towards the wall of the combustion chamber leaving the center portion of the combustion chamber relatively free of combustion products and the resulting elevated temperatures. The lower central axis temperatures of the combustion chamber facilitates a nozzle plug to be attached by a plug support to the injector.

Using a nozzle plug in the rocket engine provides self-compensation for changes in the nozzle ambient back pressure, resulting in a maximum nozzle thrust coefficient at any altitude for a given nozzle expansion ratio. In addition, a rocket engine in accordance with the teachings of the invention provides significantly reduced nozzle length. For example, comparing several configurations of rocket engines having an expansion ratio of 23:1 indicates that an engine in accordance with the teachings of the invention has a nozzle length that is 60 percent that of a comparable bell nozzle, and only 41 percent that of a comparable conical nozzle.

Thus it will be appreciated from the above that as a result of the present invention, a rocket engine is provided by which several principal and desirable operating characteristics are achieved. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A rocket engine having a nozzle thrust coefficient which is at or near maximum regardless of ambient backpressure, said engine being comprised of:
   a combustion chamber having an injector end and a nozzle end;
   a nozzle throat being formed at the nozzle end of the combustion chamber;
   a nozzle exit cone extending outwardly from the nozzle throat;
   a plug support having one end coupled to a nozzle plug, the nozzle plug compensating for changes in ambient backpressure at the nozzle exit cone such that the thrust coefficient remains at or near maximum possible when subjected to changes in ambient backpressure; and
   a propellant injector disposed at the injector end of said combustion chamber and having another end of said plug support coupled thereto, wherein said propellant injector has a central portion with a plurality of injector ports disposed therein, said injector ports oriented to discharge in a direction extending at a positive angle away from the plug support, at least one of said injector ports in fluid communication with a fuel source, at least one of said injector ports in fluid communication with an oxidizer source.

2. The rocket engine of claim 1, wherein the propellant injector provides a shaped flow of fuel and oxidizer extending at a positive angle away from the plug support.

3. The rocket engine of claim 1 wherein the propellant injector is a pintle injector.

4. The rocket engine of claim 1 wherein the plug support is coupled to the propellant injector in a cantilever fashion.

5. The rocket engine of claim 1 wherein the plug support and nozzle plug include a coolant channel.

6. The rocket engine of claim 5 wherein the plug support further includes a coolant bleed hole for providing a flow of coolant over an external surface of the plug support.

7. The rocket engine of claim 5 further including a seal coupled between the propellant injector and the plug support to provide an independently controlled bleed of coolant.

8. The rocket engine of claim 1 wherein the plug support and nozzle plug are constructed from a high temperature material selected from the group of: beryllium-copper, nickel, ceramics, tantalum and molybdenum.

9. The rocket engine of claim 1 wherein the nozzle throat has a cross-sectional shape formed by an outer contour of an inner body and an inner contour of an outer body, said bodies having any combination of contour shapes selected from the group of: circles, ovals, squares, trapezoids, regular polygons, irregular polygons, and blended combinations of the foregoing shapes.

10. The rocket engine of claim 1 wherein the nozzle plug support is threadingly engaged to the pintle injector.

11. The rocket engine of claim 1 wherein the nozzle plug in combination with the nozzle throat and nozzle exit cone provides full external expansion off of the nozzle plug.

12. The rocket engine of claim 1 wherein the nozzle plug in combination with the nozzle throat and nozzle exit cone provides partial internal expansion off of the nozzle plug.

13. The rocket engine of claim 1 wherein the plug support is constructed of a sintered metal so that transpiration cooling is provided.

14. A rocket engine having a fixed nozzle expansion ratio and a thrust coefficient that is maximized for any ambient backprsssure condition, comprising:
   a combustion chamber having a nozzle end and an injector end;
   a nozzle throat being formed at the nozzle end of the combustion chamber;
   a nozzle exit cone extending outwardly from the throat region;
   a plug support having one end coupled to a nozzle plug, the nozzle plug providing self-compensation for changes in nozzle ambient backpressure, whereby the maximum thrust coefficient remains at or near the maximum theoretically achievable for any given ambient pressure condition; and
   a pintle injector disposed at the injector end of said combustion chamber and having another end of said plug support coupled thereto in cantilever fashion, wherein said pintle injector has a central portion with a plurality of injector ports disposed therein, said injector ports oriented to discharge in a direction extending at a positive angle away from the plug support, at least one of said injector ports in fluid communication with a fuel source, at least one of said injector ports in fluid communication with an oxidizer source.

15. The rocket engine of claim 14 wherein the plug support is threadingly engaged to the pintle injector.

16. The rocket engine of claim 14 wherein the nozzle plug in combination with the nozzle throat and nozzle exit cone provides full external expansion off of the nozzle plug.

17. The rocket engine of claim 14 wherein the nozzle plug in combination with the nozzle throat and nozzle exit cone provides partial internal expansion off of the nozzle plug.

18. The rocket engine of claim 14 wherein the nozzle plug has a cross-sectional shape selected from the group of: circles, ovals, squares, trapezoids, regular polygons, irregular polygons, and blended combinations thereof.

19. The rocket engine of claim 14 wherein the nozzle plug includes a coolant channel to provide regenerative cooling of the nozzle plug.

20. The rocket engine of claim 19 wherein the nozzle plug includes at least one bleed hole coupled to the coolant channel to provide film cooling of an outmost channel wall that is exposed to combustion gases.

21. The rocket engine of claim 19 further including a seal coupled between the pintle injector and the plug support to provide an independently controlled bleed of coolant.

22. The rocket engine of claim 19 wherein the nozzle plug and plug support are constructed from a high temperature material selected from the group of: beryllium-copper, nickel, ceramics, tantalum and molybdenum.

23. The rocket engine of claim 19 wherein the pintle injector includes a coaxial tube coupled to the cooling channel for providing coolant.

24. A rocket engine having a fixed nozzle expansion ratio and a thrust coefficient that is maximized for any ambient backpressure condition, comprising:
- a combustion chamber having an injector end and a nozzle end;
- a nozzle throat being formed at the nozzle end of the combustion chamber;
- a nozzle exit cone extending outwardly from the nozzle throat; and
- a plug support constructed of a high temperature material, the plug support including a cooling channel for providing regenerative cooling;
- a nozzle plug constructed of a high temperature material coupled to the plug support, the nozzle plug providing self-compensation for changes in nozzle ambient backpressure, whereby the thrust coefficient remains at or near a maximum theoretically achievable for any given ambient backpressure condition; and
- a pintle injector disposed at the injector end of said combustion chamber and having said plug support coupled therto in a cantilever fashion, wherein said pintle injector has a central portion with a plurality of injector ports disposed therein, said injector ports oriented to discharge in a direction extending at a positive angle away from the plug support, at least one of said injector ports in fluid communication with a fuel source, at least one of said injector ports in fluid communication with an oxidizer source.

25. A rocket engine having a fixed nozzle expansion ratio and a thrust coefficient that is maximized for any ambient backpressure condition, comprising:
- a combustion chamber having an injector end and a nozzle end;
- a nozzle throat being formed at the nozzle end of the combustion chamber;
- a nozzle exit cone extending outwardly from the nozzle throat; and
- a plug support constructed of a porous material so that transpiration cooling is provided;
- a nozzle plug constructed of a high temperature material coupled to the plug support, the nozzle plug providing self-compensation for changes in nozzle ambient backpressure, whereby the thrust coefficient remains at or near a maximum theoretically achievable for any given ambient pressure condition; and
- a pintle injector disposed at the injector end of said combustion chamber and having said plug support coupled thereto in a cantilever fashion, wherein said pintle injector has a central portion with a plurality of injector ports disposed therein, said injector ports oriented to discharge in a direction extending at a positive angle away from the plug support, at least one of said injector ports in fluid communication with a fuel source, at least one of said injector ports in fluid communication with an oxidizer source.

* * * * *